United States Patent [19]
Paglia

[11] 3,760,701
[45] Sept. 25, 1973

[54] PHOTOGRAPHIC APPARATUS WITH DELAYED INTERLOCK SWITCH

[75] Inventor: Richard Paglia, Carlisle, Mass.

[73] Assignee: Polaroid Corporation, Cambridge, Mass.

[22] Filed: Aug. 9, 1972

[21] Appl. No.: 279,026

Related U.S. Application Data

[63] Continuation of Ser. No. 213,316, Dec. 29, 1971, abandoned.

[52] U.S. Cl. .................................. 95/11 R, 95/14
[51] Int. Cl. ..................... G03b 17/52, G03b 17/00
[58] Field of Search ................... 95/11 R, 13, 14, 95/31 EL, 19, 39, 42

[56] References Cited
UNITED STATES PATENTS

| | | | |
|---|---|---|---|
| 2,553,656 | 5/1951 | Kirby | 95/42 X |
| 3,111,585 | 11/1963 | Sand et al. | 95/14 X |
| 3,643,567 | 2/1972 | Douglas | 95/11 R |

*Primary Examiner*—Robert P. Greiner
*Attorney*—Gerald L. Smith et al.

[57] ABSTRACT

Photographic apparatus of a variety suited to accept a film supply in the form of a disposable cassette. Upon insertion of such a cassette within a receiving chamber, a loading access door is closed to secure the cassette within the noted chamber as well as to energize a feature providing for the automatic removal of a dark slide or the like. A multiple cam actuated switch is operated in conjunction with the closure of the access door. This switch not only provides a delayed actuation of the automatic dark slide removal feature, but also serves an interlock function.

25 Claims, 8 Drawing Figures

PATENTED SEP 25 1973

INVENTOR.
RICHARD PAGLIA

BY Brown and Mikulka
and
Gerald L. Smith
ATTORNEYS

INVENTOR.
RICHARD PAGLIA

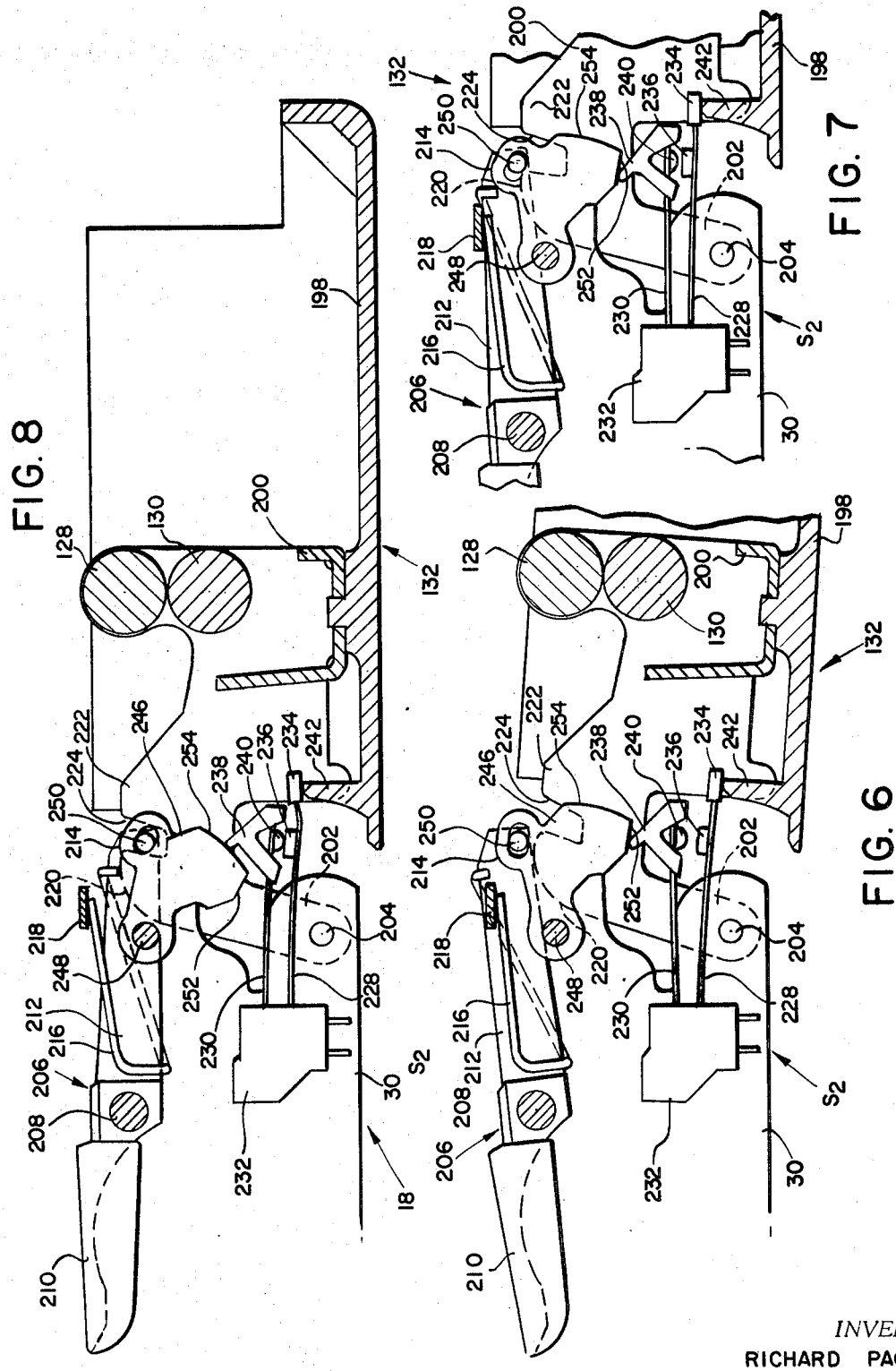

PHOTOGRAPHIC APPARATUS WITH DELAYED INTERLOCK SWITCH

This is a continuation of application Ser. No. 213,316, filed Dec. 29, 1971 and now abandoned.

BACKGROUND OF THE INVENTION

A very thin and compact photographic camera of external dimensions suited for convenient carrying in the pocket of a garment has been described in a copending application for Patent by E. H. Land, I. Blinow and V. K. Eloranta, entitled "Reflex Camera," filed Apr. 16, 1971, Ser. No. 134,733. While remaining very compact, this camera also is highly automated, incorporating such features as electronic dual perameter exposure control, motorized cocking and film transport as well as automatic, motorized insitu film processing.

Film for the camera is supplied within prepackaged disposable cassettes configured to retain a stacked assemblage of individual film units for sequential exposure at a film frame opening formed therewithin. The cassette is desinged for facile, direct insertion within a receiving chamber formed in the base of the camera. Following the insertion of a film laden cassette within the camera, a loading access door formed in a forward portion of the base thereof is pivotally closed and latched in place. The latter latching takes place as an adjunct to the unitary motion of closing the access door and must be carried out in a highly positive fashion to assure that the door remains closed throughout an ensuing series of camera cycles. Further, the latch must retain a capability of being manually unlatched to replenish the film supply.

As a consequence of the nature of the cassette-type film supply, each of the cassettes used with the camera is fabricated including a dark slide providing a preliminary cover over the film frame formed therewithin. Following insertion of the cassette within the noted receiving chamber, this dark slide must be removed to permit the exposure of an uppermost one of the film units retained by the cassette. To enhance the fully automated nature of the camera, this preliminary step of removing the dark slide prefereably is carried out automatically upon closing of the noted loading access door.

Such an automatic dark slide ejection feature requires the presence of a switch which is actuated only following the full closure of the noted access door. The same switch is also called upon to perform an interlocking security feature serving to prevent actuation of the camera should the access door remain open or improperly closed and a start switch depressed. Further, the interlock switch, when closed to complete an electrical circuit path, must maintain such closure even though components of the camera may be jostled to cause partial depression of the noted latch.

SUMMARY OF THE INVENTION

The present invention is addressed to a latching and switching feature for an automatic camera which provides not only positive latching of a loading access door permitting the securing of film cassettes within a camera, but also a switch arrangement which provides for energization of automatic dark slide removal apparatus only following the closing and latching of the noted access door. The switching arrangement of the invention provides selectively timed movement of the conductive members of a switch such that they are united only upon the spring biased movement of a latch into a fully locked position. When such contact is made, a caming feature of the switch arrangement retains the conductive members in their contacting status even though the noted latch is inadvertently partially depressed.

Another feature and object of the invention is to provide photographic apparatus for use with film containers of photographic units arranged for sequential presentation at an exposure opening. The apparatus includes a loading access door or the like which is movable from an open position, permitting the insertion of a film container, to a closed position, securing the container within the camera. A latch arrangement is provided which is movable from a releasing to a locking position in response to the closing of the loading access door. This latch positively retains the loading door at its closed position and is camed into its locking position from a latching cam formed with the loading access door. The apparatus further includes a switch arrangement having two conductive members or leaves which move toward a predetermined point of contact in the course of closing the noted loading access door. One of the switch leaves is moved from a first cam which operates in conjunction with movement of the loading access door. The other of the switch leaves is moved in correspondence with the latch, however, such movement into the noted contact is made only when the latch is closely proximate its locking position. To provide for the carefully regulated movement of the noted switch leaf the second cam arrangement is driven from the latch and is configured having a dwell profile portion in juxtaposition with a rapid rise profile portion. The rapid rise portion of the cam is configured such that the switch leaf which it contacts is moved into the noted predetermined contact point only when the latch is moved under the bias of a spring toward its locked position. After such contact is made, the dwell portion of the cam retains the switch contacting status even though slight movement may be imparted to the latch from spurious, externally generated forces.

Other objects of the invention will in part be obvious and will in part appear hereinafter.

The invention accordingly comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

Brief description of the drawings:

FIG. 6 is a partial sectional view of a cam operated interlock switch according to the instant invention;

FIG. 7 is a partial sectional view of the interlock switch of FIG. 5 showing the components thereof in a more advanced orientation; and FIG. 8 is a partial sectional view of the interlock switch of FIG. 5 showing the orientations of the components thereof when the loading access door of the camera of FIG. 1 is fully closed and latched.

Figure 1:
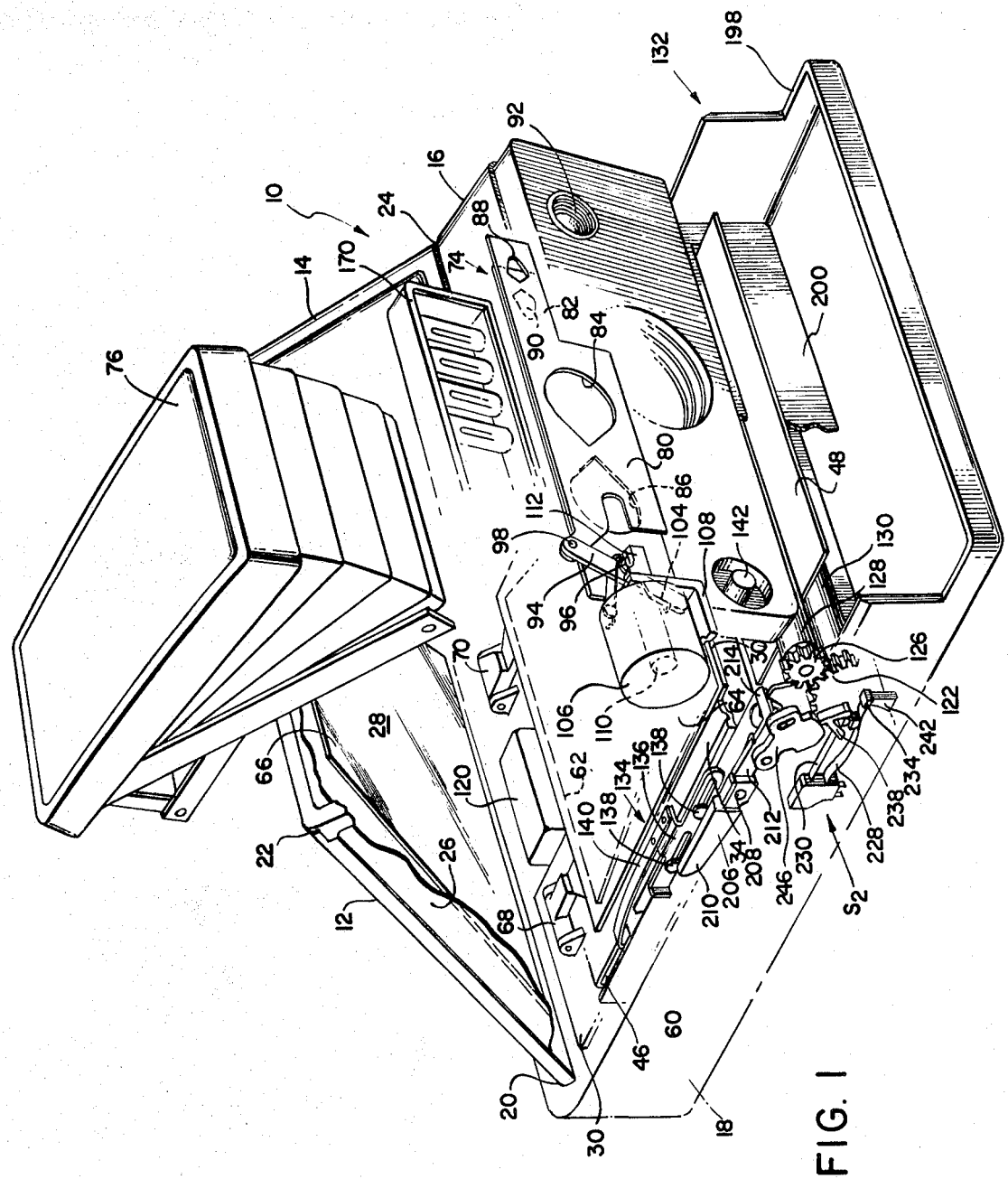
FIG. 1 is a pictoral representation of a camera embodying the latch and switching features of the instant invention with portions broken away to reveal internal structure.

Detailed Description:

Referring to FIG. 1, a fully automatic camera incorporating the features of the instant invention is portrayed generally at 10. The several articulated housing components of camera 10, including rear wall 12, forward wall 14, and exposure control housing 16 are pivotally associated with a base 18 so as to be foldable thereinto in nesting fashion. When so folded from the erected configuration shown, the camera 10 assumes a thin and compact shape suiting it to be conveniently carried in the pocket of a garment. The specific hinge connections providing for the articulated structure while not being visible in the figure, are positioned at axes 20, 22, and 24 and at the lower rear portion of exposure control housing 16. When erected for making an exposure, rear wall 12, forward wall 14 and exposure control housing 16 combine in conjunction with an opaque flexible bellows, a portion or fragment of which is illustrated at 26, to define an exposure chamber generally depicted at 28.

Base 18 includes an inner frame assembly, a portion of which is shown at 30. Inner frame assembly 30 as well as the outward portions of base 18 cooperate to provide structural support for numerous instrumentalities of the camera. For instance, frame 30 is configured to define a receiving chamber for retaining and securing a film laden cassette or container 34 at the bottom of exposure chamber 28.

Figure 2:
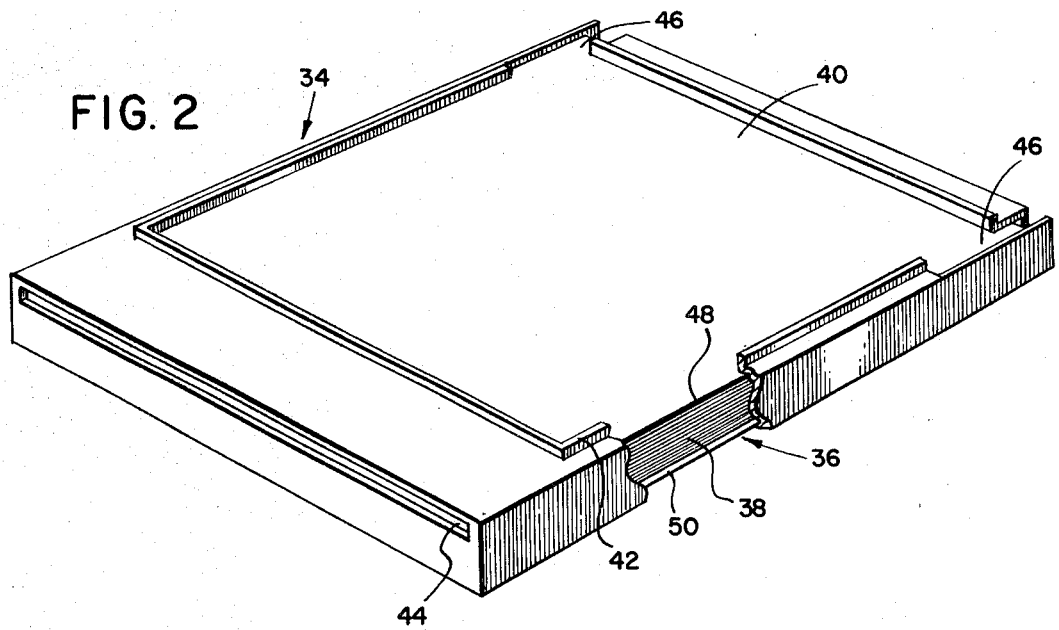
FIG. 2 is a pictoral view of a film cassette utilized with the camera of FIG. 1.

Looking additionally to FIG. 2, cassette 34 is of generally flat, rectangular shape and contains a stacked assemblage of photographic units shown generally at 36. The photosensitive ones of units 36 as depicted at 38 are arranged for sequential presentation at a light entrance portion 40 formed in the upper surface of cassette 34. Entrance portion 40 has a periphery which is defined by a ridge 42, the underside of which serves as a seat against which the uppermost unit 36 abuts. The forward wall of cassette 34 is formed having an elongate slot 44 disposed thereacross. Slot 44 serves as an egress means providing for the sequential removal of each of the units 36. Cassette 34 also is formed having slots or openings in the upward face thereof as at 46. Slots 46 permit the insertion of a component of a pick mechanism which functions to impart initial movement to units 36 as they are removed from cassette 34.

When cassettes as at 34 are initially procured from a supplier, the photosensitive film units 38 contained therein are secured from light otherwise entering opening 40 by a dark slide 48 having a configuration closely similar to the photosensitive film units 38 positioned beneath it. Once cassette 34 is positioned within its receiving chamber in camera 10, this dark slide must be removed prior to commencing a first photographic cycle. Cassette 34 also contains a battery power source 50 mounted beneath the assemblage of photographic units 36. Battery 50 is of flat configuration and is formed having terminals (not shown) which communicate with corresponding contact members within the bottom of the receiving chamber of camera 10.

Returning to FIG. 1, camera 10 operates in a modified reflex fashion, being convertible between viewing-focusing and exposure operational modes by a reflex assembly, including a somewhat planar reflex reflecting component 60. Shown at an intermediate position evidenced during a transition from one mode defining terminal position to another, the component 60 is configured having a mirror surface 62 mounted upon its underside and a viewing surface 64 positioned upon or forming its upward surface. In the course of a photographic cycle, component 60 is moved from a position against ridge 42 of cassette 34, where it serves to secure light entrance portion 40, to an exposure position abutting against a mirror 66 located upon the inner side of rear wall 12. Movement between the viewing mode and exposure mode positions is pivotal, the component 60 being coupled to inner frame 30 at hinges 68 and 70.

When component 60 is positioned over ridge 42 of cassette 34 to secure the exposure plane of camera 10, a viewing-focusing mode optical path is established. This path extends from a taking lens mounted at 72 in exposure housing 16, through an exposure mechanism depicted generally at 74, which establishes an aperture opening of maximum available width, thence to the reflecting surface of mirror 66 at the rear of the camera and thence to viewing surface 64 on the upward side of component 60. Viewing surface 64 is configured having a texture and optical design facilitating the focusing of the image of a scene to be photographed. This image may be viewed by the camera operator through a collapsible optical entrance assembly depicted generally at 76. A configuration suited for viewing surface 64 is described and claimed in a copending application for U.S. Pat. Ser. No. 83,030 filed Oct. 22, 1970 by Nathan Gold, entitled, "Reflective Imaging Apparatus" and assigned in common herewith, now U.S. Pat. No. 3,690,240, while the assembly 76 and its related internal components are described in detail in a copending application for U.S. Pat. by James G. Baker filed Dec. 15, 1970, entitled, "Reflex Camera and Viewing Device," Ser. No. 98,356 and assigned in common herewith.

The exposure mode optical path orientation of camera 10 is established by pivoting reflex component 60 into abutment against or closely adjacent mirror 66 at rear wall 12. In this orientation, the optical path extends from taking lens 72 and exposure mechanism 74 to mirror 62 positioned on the underside of reflex component 60, thence to the uppermost one of the film units 38 positioned beneath ridge 42 of cassette 34. This uppermost one of the film units 38 is located at the exposure plane of camera 10 when in abutment against the underside of ridge 42.

In the course of a photographic cycle, exposure mechanism 74 not only provides for exposure regulation, but also serves to secure exposure chamber 28 from light otherwise entering from taking lens 72 during periods of conversion from one operational mode to another. The mechanism is shown to be formed having two blades or elements 80 and 82 which slidably ride in a track (not shown) mounted within exposure housing 16. Each blade, 80 and 82, is formed having a teardrop shaped aperture opening as shown respectively at 84 and 86. Additionally, the blades are formed having secondary openings shown respectively at 88 and 90 which move in synchronism with openings 84 and 86 before the detecting elements of a photosensing network positioned behind an entrance optical assembly 92. Depending upon the position of blades 80 and 82, openings 84 and 86 symmetrically overlap to define selectively varying aperture sizes about taking lens 72. Similarly, secondary openings 88 and 90 are configured in correspondence with the contours of respective openings 84 and 86 to provide an aperutre responsive input to the control circuitry of camera 10.

Blades 80 and 82 move in mutual symmetry as a result of their connection with a walking beam shown at 94. Walking beam 94 is pivotally mounted within exposure housing 16 at a centrally disposed hub portion 96. Each tip portion of walking beam 94 is pivotally connected as at 98 to a select one of blades 80 and 82. Blades 80 and 82 are biased so as to establish a maximum available aperture by a spring 104 wound about hub 96 and connected between walking beam 94 and a portion of exposure housing 16. Movement of blades 80 and 82 from their normally open orientation permitting viewing and focusing into a closed orientation blocking the passage of light along the optical path of camera 10 is carried out by a tractive electromagnetic drive present as a solenoid 106 mounted within exposure housing 16 upon a bracket as at 108. Solenoid 106 is designed having an internally disposed cylindrical plunger or armature 110 which retracts inwardly within an excitation winding upon energization thereof. Plunger 110 is connected to walking beam 94 by a comb-shaped connector 112 slidably fitted over a pin extending therefrom.

When solenoid 106 is energized to retract plunger 110, walking beam 94 is rotated rapidly against the bias of spring 104 to move blades 80 and 82 into the fully closed orientation shown in FIG. 1. Mechanism 74 is described in detail and claimed in a copending application for United States Patent by V. K. Eloranta, entitled "Exposure Control System," filed Sept. 2, 1970, Ser. No. 68,919 and assigned in common herewith, now U.S. Pat. No. 3,641,889.

Figure 4:
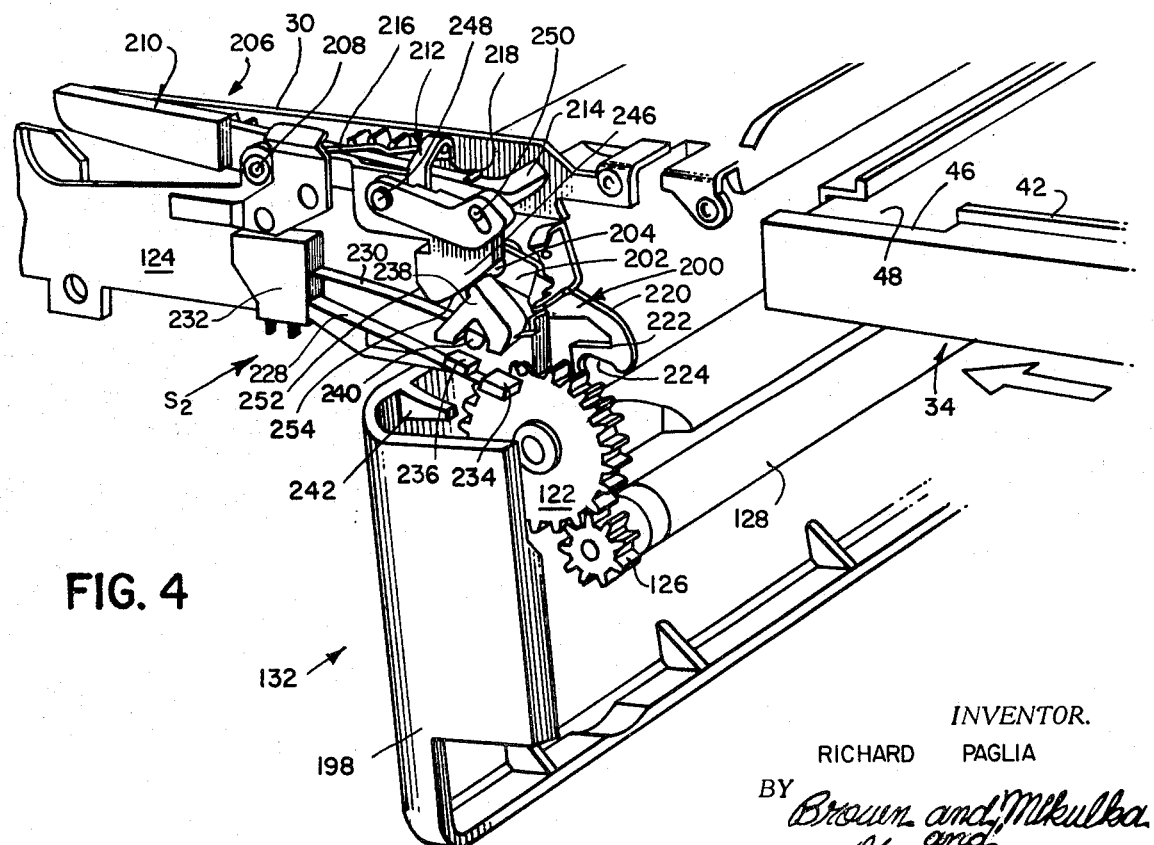
FIG. 4 is a partial pictoral view of the forward portion of the camera of FIG. 1.

During a viewing-focusing operational mode, when spring 104 holds blades 80 and 82 in a terminal position defining maximum aperture, reflex component 60 is held in its light securing position over light entrance portion 40 of cassette 34 by a driven instrumentality operating upon component 60 through hinge 68. Described in detail in the above-noted copending application for U.S. Pat. Ser. No. 134,733, the driven instrumentality is regulated from a cycle control system which utilizes the output of a motor 120 to selectively drive a gear train extending along one side of base 18 and terminating at a spur gear shown at 122. The various gear components of the noted gear train are rotatably mounted upon camera 10 between inner frame 30 and an outer plate 124 (FIG. 4).

Spur gear 122 of the noted elongate gear train is in driving connection with a drive pinion 126. Pinion 126 is in driving connection with the uppermost one of a pair of processing rolls 128 and 130. Rolls 128 and 130 are mounted within a loading access door assembly shown generally at 132 in a position wherein they may receive and process individual ones of photographic units 36 as they are withdrawn from cassette 34.

Removal of photographic units 36 from cassette 34 is carried out by a pick mechanism depicted generally at 134. Driven from motor 120 through the noted gear train, mechanism 134 includes a carriage 136 slidably mounted upon pins as at 138 fixed, in turn, to inner frame 30. Carriage 136 supports a resilient pick member 140, the outward tip of which is configured to extend into and slide along slot 46 of cassette 34.

Described in detail in a copending application for U.S. Pat. Ser. No. 171,127 by E. H. Land, entitled "Film Advancing Apparatus," filed Aug. 12, 1971 and assinged in common herewith, mechanism 134 operates in accordance with a photographic cycle control arrangement to move rearwardly until pick member 140 engages the rear edge of an uppermost photographic unit 36. At an appropriate time during a photographic cycle, carriage 136 is driven forwardly, serving to move an engaged photographic unit 36 through slot 44 of cassette 34 and into the bite of processing rolls 128 and 130. When engaged by these rolls, the unit 36 is driven from camera 10 in a manner providing for its insitu processing. Such processing is described in detail in a U.S. Pat. by E. H. Land, No. 3,145,646 entitled, "Novel Photographic Products and Processes."

Figure 3:
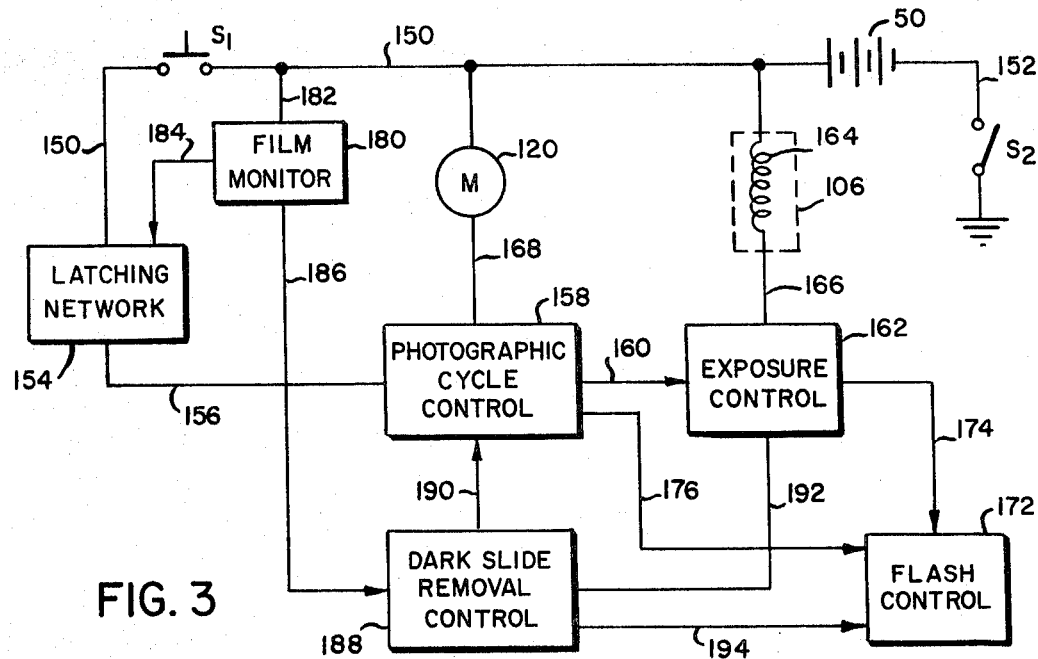
FIG. 3 is a schematic drawing of a control system which may be incorporated with the camera of FIG. 1.

Camera 10 is operated under a photographic cycle involving a predetermined series of operational events. This cycle is commenced following viewing and focusing which is carried out under a component organization wherein exposure mechanism blades 80 and 82 define an aperture opening of maximum extent and reflex component 60 is in a light securing position against ridge 42 of cassette 34. Referring additionally to FIG. 3, a cycle is initiated with a depression of a start button 142 located upon the forward face of exposure housing 16. Depression of button 142 serves to close the contacts of a switch designated $S_1$ in FIG. 3. Switch $S_1$ is connected through a primary line 150 to battery 50 which, in turn, is connected along line 152 through a switch designated $S_2$ to ground. Activation of line 150 from battery 50 serves to energize a latching network designated 154. Described and claimed in a copending application for United States Patent by J. P. Burgarella, P. P. Carcia and R. C. Kee, entitled "Control System for Photographic Apparatus," Ser. No. 213,317 filed Dec. 29, 1971. and assinged in common herewith, network 154 serves to energize the control system of camera 10 as well as to premit continued energization thereof following a predetermined operational event. The energizing output of latching network 154 is introduced along line 156 to a photographic cycle control function 158. Described in detail and claimed in a copending application for U.S. Pat. by E. K. Shenk, entitled "Reflex Camera with Motor Drive," Ser. No. 134,725, filed Apr. 16, 1971 and assigned in common herewith, cycle control function 158 provides an initial input signal along line 160 to the exposure control network 162 of the camera. This initial signal causes control function 162 to energize the excitation winding 164 of solenoid 106 so as to cause the rapid closure of exposure mechanism blades 80 and 82. Excitation winding 164 is shown connected within line 166 between exposure control function 162 and primary power line 150.

When exposure chamber 28 is secured by the closure of blades 80 and 82, cycle control 158 functions to briefly energize motor 120. Motor 120 is coupled between cycle control 158 and primary power line 150 by line 168. Thus energized, motor 120 drives the earlier noted gear train to effect an unlatching of reflex component 60, thereby permitting its spring-driven movement into an exposure mode operational position against backwall 12 of camera 10. The components of camera 10 now assume an exposure mode orientation and exposure control 162, signaled from photographic cycle control 158, commences an exposure interval by de-energizing excitation winding 164 to permit blades 80 and 82 to commence opening under the bias of spring 106.

Following an appropriately regulated exposure interval, exposure control function 162 again energizes excitation winding 164 to cause blades 80 and 82 to be driven rapidly to their fully closed position to terminate an exposure. Under circumstances where artificial illumination is utilized, for instance by firing a lamp within a multilamp flash assembly as shown at 170, exposure control network 162 signals a flash control network 172 from along line 174 to effect an appropriately synchronized flashlamp ignition during the above noted exposure interval. Flash control 172 also provides appropriate exposure perameter regulation for flash mode operation when enabled through the insertion of assembly 170 onto exposure housing 16. A control system suited to perform in accordance with the operation of flash control network 172 is described in detail and claimed in a copending application for United States Patent by V. K. Eloranta and E. K. Shenk, entitled, "Focus Responsive Exposure Control System," Ser. No. 135,211 filed, Apr. 19, 1971 and assigned in common herewith. The enabling of flash control network 172 from photographic cycle control 158 is represented by line input 176.

Following the noted exposure interval, photographic cycle control 158 carries out the terminal portions of a photographic cycle by again energizing motor 120 from line 168. The resultant second energization of motor 120 serves to actuate pick mechanism 134 to draw an uppermost photographic unit 36 from cassette 34 and into the bite of processing station rolls 128 and 130. Rolls 128 and 130 are rotatably driven at this time by drive pinion 126 which is engaged with the noted gear train at spur geat 122. Accordingly, photographic unit 36 is driven from the receiving chamber of camera 10. Additionally, the second energization of motor 120 serves to cock reflex component 66 into its film plane securing, exposure mode orientation against ridge 42 of cassette 34. When reflex component 66 is fully cocked and a photographic unit 36 is fully processed or driven from camera 10, the control system of the camera is automatically shut down or quenched through appropriate signaling at latching network 154.

As evidenced in FIG. 1, pick mechanism 134 as well as rolls 128 and 130 of the processing station of camera 10 serve the additional function of removing an uppermost photographic unit 36 within cassette 34, for instance dark slide 48, whenever a cassette is newly inserted within the receiving chamber of camera 10. This removal is carried out automatically without recourse to the depression of switch $S_1$. As described in detail and claimed in a copending application for United States Patent entitled "Photographic Apparatus and System with Automatic Film Cover Ejection," by E. H. Land and P. P. Carcia, Ser. No. 213,318, filed Dec. 29, 1971 and assigned in common herewith, this ejection feature operates in conjunction with a film monitor depicted at 180.

Operating in association with an exposure counter located within the receiving chamber of camera 10, monitor 180 serves to sense the absence of a cassette 34 and, in consequence thereof, enable the remainder of the control system to carry out a dark slide ejection cycle. Powered from line 50 through line 182, monitor 180 overrides switch $S_1$ and powers the circuit from line 184 through latching network 154. Simultaneously, monitor 180 inserts an appropriate signal from line 186 to a dark slide removal control function shown at 188. Control function 188, in turn, signals photographic cycle control 158 from line 190 in a manner causing it to progress through an entire photographic cycle wherein uppermost photographic unit 36, for instance, dark slide 48 is engaged by pick member 140 and drawn into the bite of processing station rolls 128 and 130, whereupon it is driven from the receiving chamber of the camera. Signaling from line 192, control function 188 also imposes a "zero exposure" command upon exposure control function 162 prohibiting the opening of blades 80 and 82 throughout the ejection sequence. Additionally, control function 188, signaling from line 194 suppresses the operation of flash control system 172, thereby preventing the inadvertent firing of a flashlamp within assembly 170.

The initiation of the above described ejection cycle is carried out with the closure of an inter lock switch $S_2$ present in line 152. Switch $S_2$ operates in conjunction with the closing of the loading access door assembly 132. The closure of switch $S_2$ must be carried out under a delay condition assuring the full latching of door 132 in its position before activation of the energization network. Switch $S_2$ must also serve an interlock function wherein it will not be actuated in the event of inproper seating of the door assembly at its closed position.

Referring to FIG. 4, the forward portion of base 18 is revealed in enhanced detail to display loading access door assembly 132. Assembly 132 includes an outer cover 198, the internal bottom surface of which is attached to the lowermost portion of a hinge bracket 200. The forward portion of bracket 200 supports processing station components including rolls 128 and 120 along with drive pinion 126 and spur gear 122. Bracket 200 extends rearwardly on each side of base 18 to define hinge arms as at 202 which are pivotally coupled to inner frame 30 at hinge pins as at 204 fixed to and extending therefrom. Thus pivotally connected to inner frame 30, loading access assembly 132 can be manually manipulated from the closed or securing position shown in FIGS. 1 and 8 to the open position shown in FIG. 4, the latter position providing access for directly inserting a cassette 34 in the general direction shown by the arrow.

When in the noted closed or securing position, loading access door 132 is retained or locked by a manually actuated latch 206. Latch 206 is pivotally mounted at about its midpoint upon an axle 208 extending between inner frame 30 and outerplate 124. One side of latch 206 is formed as a finger engageable lever 210 and the side 212 opposite lever 210 extends to form a latching tip 214 protruding inwardly. A spring 216 having one end wound about side 212 and the opposite end grounded against a tab 218 extending inwardly from outer plate 124 serves to bias latch 206 in a direction urging tip 214 downwardly.

Latching tip 214 iy configured to slidably engage with a rising profile form of cam surface 220 of a latching extension 222 in hinge bracket 200. Extension 222 so positions cam surface 220 that when loading door assembly 132 is manually pivoted about hinge pins 204 toward the closed position of FIG. 8, latching tip 214 is engaged by cam surface 220 and is gradually elevated until such time as it falls from the rising profile portion of cam 220 and into a latching recess 224 juxtaposed thereto. In that position, as illustrated in FIGS. 1 and 8, loading door assembly 132 is locked to secure a cassette 34 within the receiving chamber of the camera.

Switch $S_2$ operates in conjunction with the above described movement of loading access door assembly 132 to and from the noted securing or locked position. The switch is configured having two resilient leaves 228 and 230 which extend from and are supported by an insulative base 232 fixed to outer plate 124. The outer tip of lower leaf 228 is formed to support an insulative caming tip 234, while intermediate tip 234 and base 232, the cantelevered leaf supports a contact 236. Similarly, upper leaf 230 is formed having a caming tip 238 disposed about an outwardly positioned contact 240.

Figure 5:
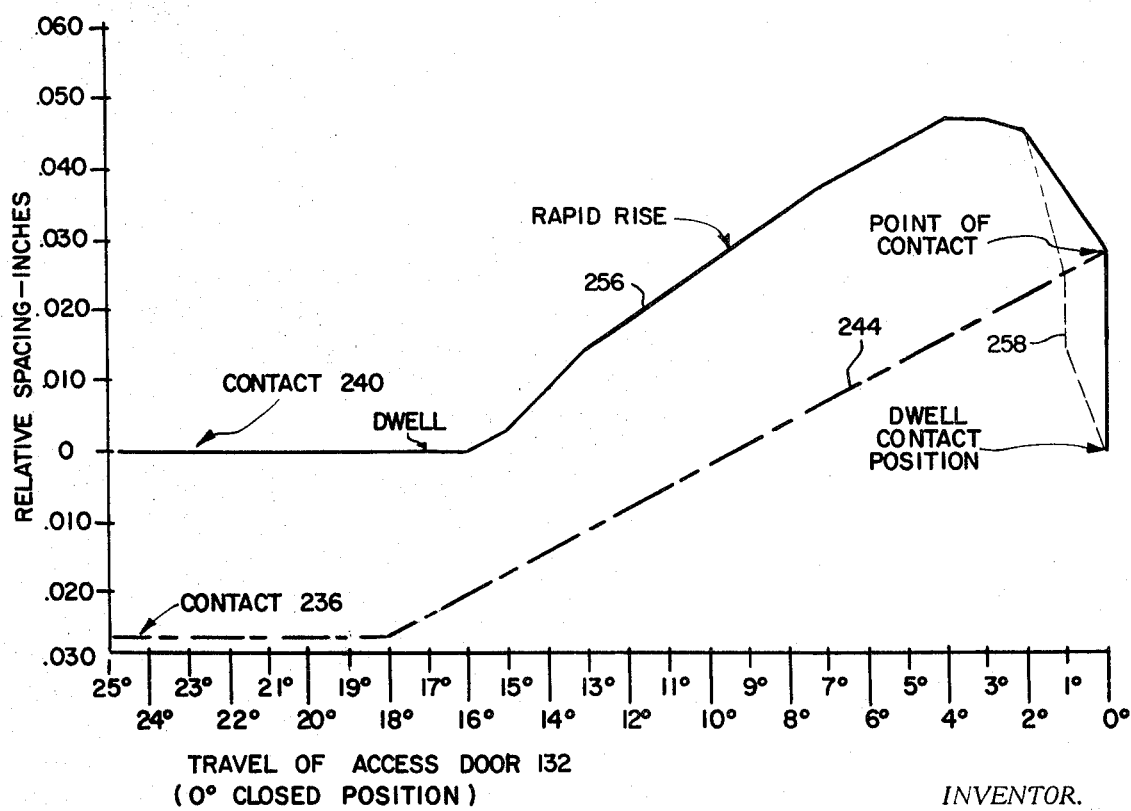
FIG. 5 is a chart depicting the relative movement of the contacts of an interlock switch provided with the instant invention.

When loading access door assembly 132 is moved from the open orientation of FIG. 4 to the closed orientation shown in FIG. 8, switch $S_2$ is actuated such that contacts 236 and 240 are joined only after latching tip 214 of latch 210 has commenced to move downwardly into latching recess 224. To carry out this synchronous relationship between operation of assembly 132 and actuation of switch $S_2$, each leaf 228 and 230 of switch $S_2$ is moved by a unique cam arrangement. In this regard, outer cover 198 is formed incorporating a caming stud 242 which is configured and positioned to selectively engage the tip 234 of lower leaf 228 as hinge bracket 200 is pivoted upwardly. As hinge bracket 200 reaches or moves closely proximate its closed or zero degree position, stud 242 will position contact 236 of leaf 228 at a predetermined point of contact. An orientation of tip 234 and stud 242 as hinge bracket 200 has camed tip 214 of latch 206 to about a peak elevation of cam surface 220 is revealed in FIG. 6, while the position of leaf 228 and its associated contact 236 and tip 234 at the instant hinge bracket 200 reaches its fully closed position is revealed in FIG. 7. Referring additionally to FIG. 5, a chart of the relative position of contact 236 of leaf 228 as hinge 200 is rotated from an open position (noted for reference as at 25°) to a closed position (referenced as 0°) is revealed by curve 244. Curve 244 is arranged such that the relative spacing of contacts 236 and 240 may be observed as such spacing deviated from a full contact position referred to in the drawing as 0.0, or "dwell contact position." Note in the figure that contact 236 is spaced about 0.030 inch from contact 240 when hinge bracket 200 is pivoted beyond 18° from its closed position. As bracket 200 moves from the 18° position towards its closed or 0° position, stud 242 contacts tip 234 to elevate contact 236 in a somewhat linear fashion toward a "point of contact."

The movement of contact 240 of upper leaf 230 during the closure of loading access door assembly 132 is more detailed. As latching tip 214 of latch 206 is driven upwardly by the rising profile of cam surface 220, a switching cam 246 is actuated to insure the separation of contacts 236 and 240 even though contact 236 is moving toward their initial point of contact. Switching cam 246 is pivotally connected to outer plate 124 at a pin 248 and, additionally, is connected through an elongate slot to a pin 250 extending outwardly from latching tip 214. The profile of switching cam 246 is configured to define a rapid rise portion 252 which is juxtaposed to a dwell portion 254.

When assembly 132 is in its fully open position as shown in FIG. 4, tip 238 of upper leaf 230 is retained at a "dwell position" in consequence of its contact with dwell portion 254 of switching cam 246. This "0°" position is labeled "dwell" at curve 256 of FIG. 3 and is maintained until hinge bracket 200 is pivoted to within about 16 degrees of its closed position. At that point, the rapid rise profile 252 of cam 246 moves into contact with tip 238 to effect its elevation as the rising cam surface 220 of latching extension 222 continues to elevate latching tip 214. The resultant movement of contact 240 away from its point of contact with contact 236 continues to the maximum position illustrated at FIG. 6. When the inflection position of cam surface 220 of latching extension 222 is reached, latching tip 214 of latch 206 commences to move downwardly, thereby reversing the rotational direction of switching cam 246 from a counterclockwise to a clockwise direction as understood from the sense of the figures. During this movement, tip 238 is cammed in a downward direction thereby moving contact 240 towards its point of contact with contact 236. This point of contact is realized, as labeled in FIG. 3, in the course of added movement under the influence of rapid rise portion 252 of cam 246.

Following initial contact as illustrated in FIG. 7, the rapid rise profile portion of cam 246 continues to drive contact 240 and, as a consequence contact 236, in a downward direction toward a 0° or "dwell contact position" as labeled in FIG. 3 and illustrated at FIG. 8. The additional movement imparted to tip 238 during the noted mutually contacting final movement is absorbed by flexing leaf 228.

FIG. 8 further reveals that the dwell contact position of contact 236 and 240 is maintained in consequence of the contact of tip 238 with about the mid portion of dwell profile 254. Through the use of this dwell profile retention of contacts, any inadvertent depression of lever 210 of latch 206 in the course of camera usage will not break the energizing circuit of the camera, i.e. dwell profile 254 merely will move in contact with tip 238, imparting no motion thereto. The latter arrangement eliminates an "oversensitive" interlock switching technique. The dwell profile feature of switch $S_2$ also permits construction of the latch under more easily realized tolerances. Such broadened tolerance features are highly desired where high volume manufacture is contemplated.

Preferably, the "point of contact" between contacts 236 and 240 takes place at the "0°" position illustrated in FIG. 5. A modicum of leeway may be permissible in this regard, however. For instance, in some applications, such contact may be affected within about 1° of attaining full closure of loading access door assembly 132. The switch leaf characteristic for such performance is illustrated in FIG. 5 by dashed curve 258.

Since certain changes may be made in the above described apparatus without departing from the scope of the invention herein involved, it is intended that all matter contained in the description thereof or shown in the accompanying drawings shall be interpreted as illustrative and not in a limiting sense.

I claim:

1. Photographic apparatus for use with containers for an assemblage of photographic units arranged for sequential presentation at an exposure opening, comprising:

a housing having a receiving chamber configured to receive a said container;

a source of electrical energy;

exposure means mounted with said housing for controllably exposing photosensitive ones of said photographic units;

drive means actuable to engage with and remove the said presented one of said photographic units from said container;

control means energizable from said source for selectively actuating said drive means;

loading access means movable from an open position, permitting the insertion of a said container within said receiving chamber, to a closed position for securing said container within said chamber;

latch means movable from releasing to locking positions in response to said loading access means movement toward said closed position for selectively retaining said loading access means at said closed position;

means for biasing said latch means to move toward said locking position;

switch means having at least two conductive members movable toward a predetermined point of contact to complete an electrical circuit path of said control means to as to actuate said drive means;

first cam means movable in correspondence with said loading access means toward said closed position for moving one said conductive member toward said predetermined point of contact; and second cam means movable in correspondence with said latch means movement for moving the other said conductive member to said point of contact when said latch means is at least closely proximate said locking position, whereby said drive means is automatically actuated only following the closure and latching of said loading access means.

2. The photographic apparatus of claim 1 in which said first cam means is configured to position said one conductive member at said predetermined point of contact when said loading access means is at or closely proximate said closed position.

3. The photographic apparatus of claim 1 in which said second cam means is configured for effecting movement of said other conductive member away from said predetermined point of contact during select portions of said first cam means movement to position said one conductive member at said predetermined point of contact.

4. The photographic apparatus of claim 1 in which said switch means is coupled intermediate and in energy supplying relationship between said source of electrical energy and said control means, so as to provide an interlock function for said photographic apparatus.

5. The photographic apparatus of claim 1 in which said second cam means is configured having a dwell/-profile portion in juxtaposition with a rapid rise profile portion, said rapid rise portion being configured and arranged for moving said other conductive member toward and away from said predetermined point of contact, and said dwell portion being configured and arranged for retaining said other conductive member at a dwell contact position spaced a predetermined distance from said point of contact.

6. The photographic apparatus of claim 5 in which said first cam means is configured to position said one conductive member at said predetermined point of contact when said loading access means is at or closely proximate said closed position.

7. The photographic apparatus of claim 1 in which said second cam means is connected in driven relationship with said latch means and is configured having a dwell profile portion in juxtaposition with a rapid rise profile portion, said rapid rise portion being configured and arranged for moving said other conductive member toward and away from said predetermined point of contact, and said dwell portion being configured and arranged for retaining said other conductive member at a dwell contact position spaced a predetermined distance from said point of contact.

8. The photographic apparatus of claim 7 in which said loading access means includes latching cam means contactable with said latch means and having a rising profile portion for moving said latch means to said releasing position, and a sudden return portion for effecting said latch means movement under said bias into said locking position.

9. The photographic apparatus of claim 8 wherein said first cam means is connected to said loading access means and is configured to locate said one conductive member at said predetermined point of contact when said loading access means is at least closely proximate said closed position.

10. The photographic apparatus of claim 9 wherein said switch means includes:

a base mounted upon said housing, said one conductive member being resilient, supported in cantelever fashion therefrom, and configured for contact with said other conductive member at a position thereupon intermediate the position of contact with said first cam means and said base.

11. The photographic apparatus of claim 8 wherein said second cam means rapid rise profile portion is configured and arranged for moving said other conductive member toward said predetermined point of contact when said latching cam means sudden return portion effects said latch means movement under said bias into said locking position.

12. The photographic apparatus of claim 11 wherein said second cam means is pivotally mounted upon said housing and coupled in driven relationship with said latch means.

13. Photographic apparatus of a variety energizable from a source of electrical energy and for use with containers for an assemblage of photographic units arranged for sequential presentation at an exposure opening, comprising:

a housing having receiving means configured to receive a said container;

exposure means mounted with said housing for controllably exposing photosensitive ones of said photographic units;

instrumentality means actuable to carry out select events during an operational cycle of said apparatus;

control means energizable from said source for selectively actuating said drive means;

loading access means movable from an open position, permitting the insertion of a said container within said receiving means, to a closed position for securing said container within said receiving means;

latch means movable from releasing to locking positions in response to said loading access means movement toward said closed position for selectively retaining said loading access means at said closed position;

means for biasing said latch means to move toward said locking position; and switch means actuable in response to movement of said loading access means and to movement of said latch means for completing an electrical circuit path of said control means so as to actuate said instrumentality means.

14. The photographic apparatus of claim 13 wherein said switch means is configured having at least two conductive members movable toward a predetermined point of contact to complete said electrical circuit path.

15. The photographic apparatus of claim 14 including first cam means movable in correspondence with said loading access means toward said closed position for moving one said conductive member toward said predetermined point of contact.

16. The photographic apparatus of claim 14 in which said photographic apparatus includes second cam means movable in correspondence with said latch means movement for moving one said conductive member to a predetermined point of contact when said latch means is at least closely proximate to said locking position.

17. The photographic apparatus of claim 14 including:

first cam means movable in correspondence with said loading access means toward said closed position for moving one said conductive member toward said predetermined point of contact; and second cam means movable in correspondence with said latch means movement for moving the other said conductive member to said point of contact when said latch means is at least closely proximate said locking position, whereby said instrumentality means is automatically actuated only following the closure and latching of said loading access means.

18. The photographic apparatus of claim 17 wherein said instrumentality means includes drive means actuable in response to said switch means completion of said electrical circuit path for energizing with and removing the said presented one of said photographic units from said container.

19. The photographic apparatus of claim 17 in which said first cam means is configured to position said one conductive member at said predetermined point of contact when said loading access means is at or closely proximate said closed position.

20. The photographic apparatus of claim 17 in which said second cam means is configured for effecting movement of said other conductive member away from said predetermined point of contact during select portions of said first cam means movement to position said one conductive member at said predetermined point of contact.

21. The photographic apparatus of claim 17 in which said switch means is coupled intermediate and in energy supplying relationship between said source of electrical energy and said control means, so as to provide an interlock function for said photographic apparatus.

22. The photographic apparatus of claim 17 in which said second cam means is configured having a dwell profile portion in juxtaposition with a rapid rise profile portion, said rapid rise portion being configured and arranged for moving said other conductive member toward and away from said predetermined point of contact, and said dwell portion being configured and arranged for retaining said other conductive member at a dwell contact position spaced a predetermined distance from said point of contact.

23. The photographic apparatus of claim 22 in which said first cam means is configured to position said one conductive member at said predetermined point of contact when said loading access means is at or closely proximate said closed position.

24. The photographic apparatus of claim 17 in which said second cam means is connected in driven relationship with said latch means and is configured having a dwell profile portion in juxtaposition with a rapid rise profile portion, said rapid rise portion being configured and arranged for moving said other conductive member toward and away from said predetermined point of contact, and said dwell portion being configured and arranged for retaining said other conductive member at a dwell contact position spaced a predetermined distance from said point of contact.

25. The photographic apparatus of claim 24 in which said loading access means includes latching cam means contactable with said latch means and having a rising profile portion for moving said latch means to said releasing position, and a sudden return portion for effecting said latch means movement under said bias into said locking position.

* * * * *